No. 611,834. Patented Oct. 4, 1898.
G. G. CROWLEY.
GRINDING MACHINE.
(Application filed Nov. 13, 1897.)
(No Model.) 2 Sheets—Sheet 1.
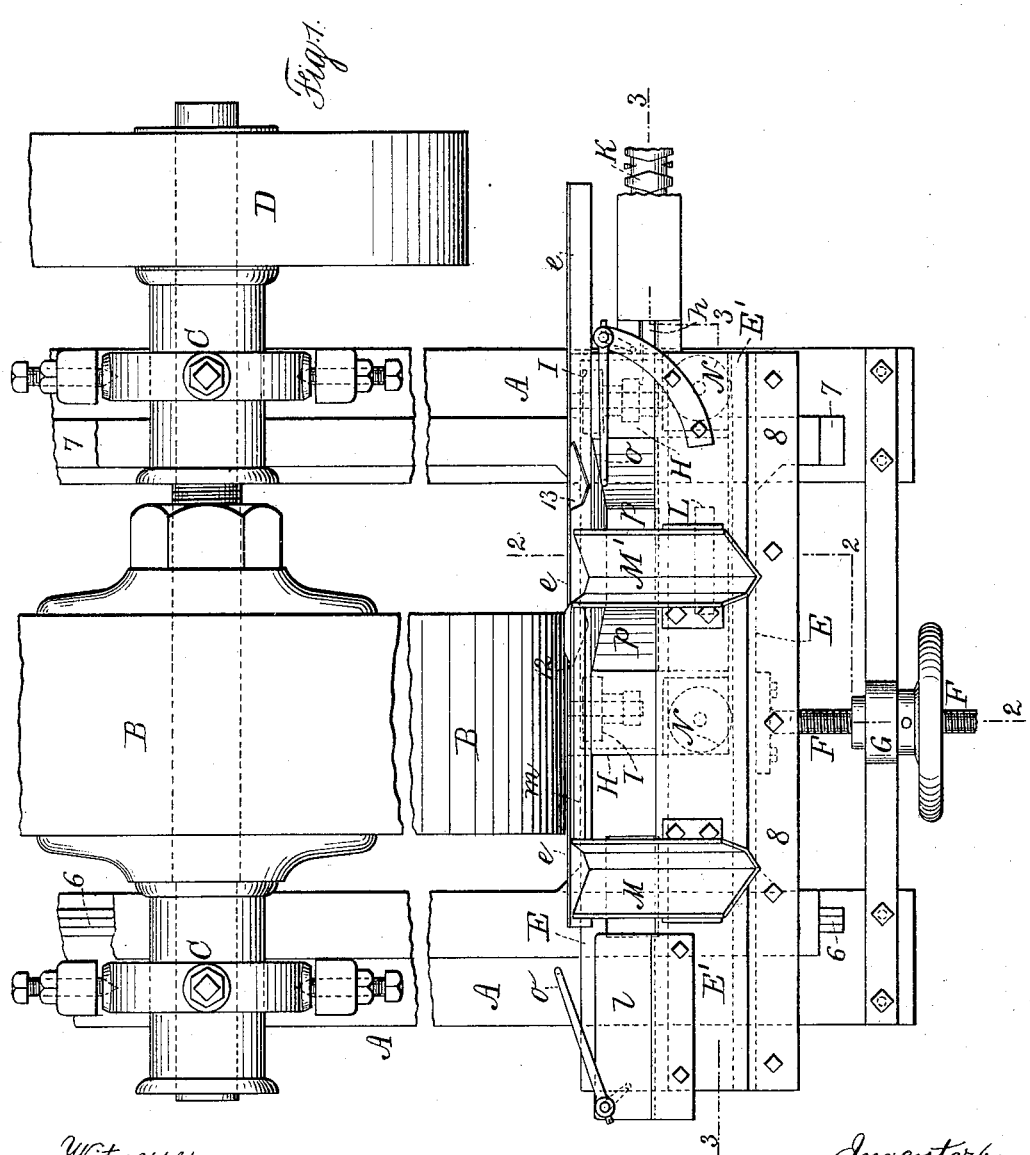

No. 611,834. Patented Oct. 4, 1898.
G. G. CROWLEY.
GRINDING MACHINE.
(Application filed Nov. 13, 1897.)
(No Model.) 2 Sheets—Sheet 2.
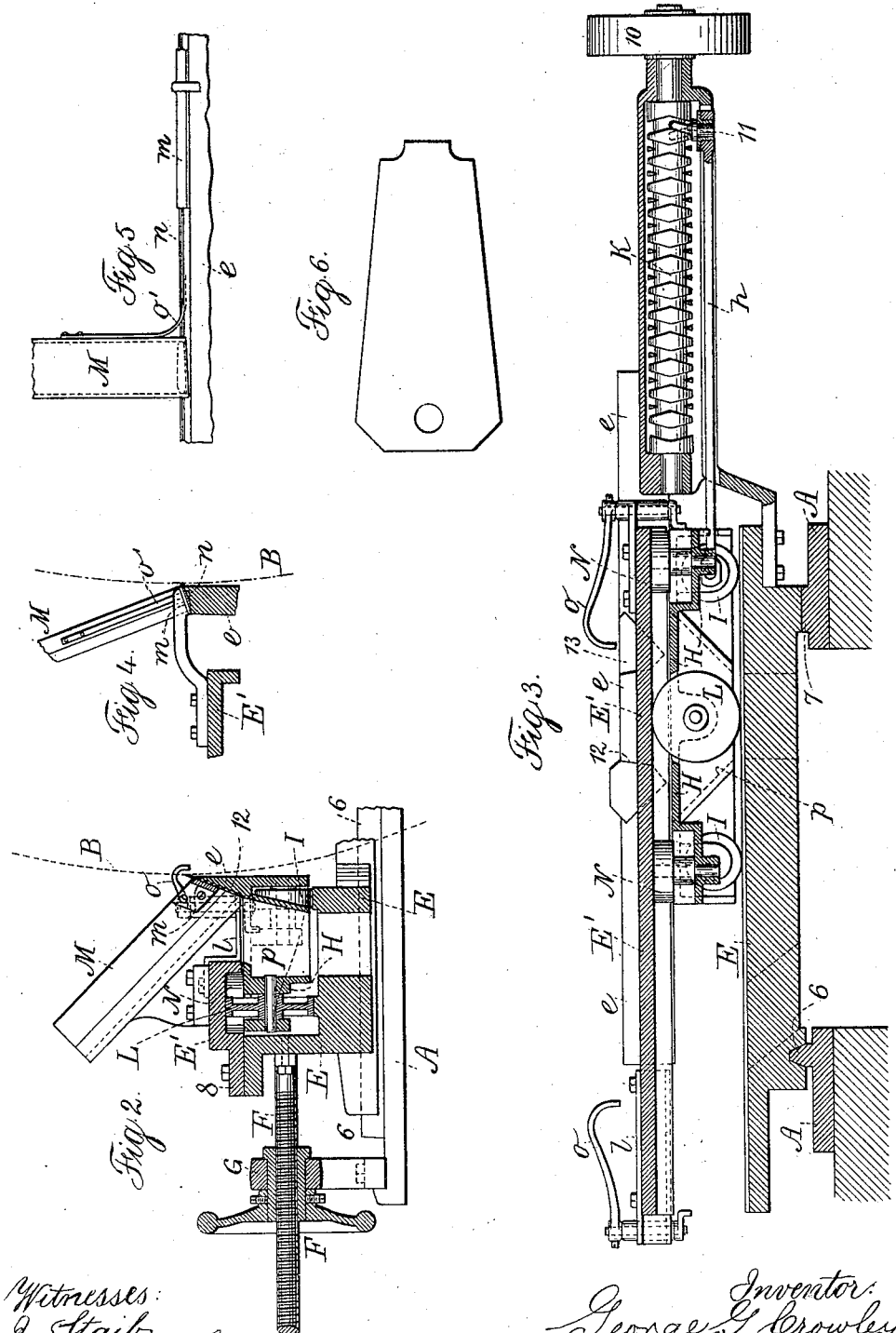

UNITED STATES PATENT OFFICE.

GEORGE G. CROWLEY, OF POUGHKEEPSIE, NEW YORK.

GRINDING-MACHINE.

SPECIFICATION forming part of Letters Patent No. 611,834, dated October 4, 1898.

Application filed November 13, 1897. Serial No. 658,363. (No model.)

*To all whom it may concern:*

Be it known that I, GEORGE G. CROWLEY, a citizen of the United States, residing at Poughkeepsie, in the county of Dutchess and State of New York, have invented a new and useful Improvement in Grinding-Machines, of which the following is a specification.

This machine is adapted to grinding the cutter and finger-plate of mowing and reaping machines. It may, however, be used for grinding other articles, especially those having cutting edges where the grinding is at an inclination or bevel.

In the present improvement the blanks, which are usually of sheet metal cut out by dies or otherwise to the proper shape, are introduced into a hopper or chute and slide down to the point of delivery, and a carriage is provided with recesses into which the blanks are received, and the carriage is supported on rollers and moved, so as to carry the blanks across the face of a revolving stone or grinder, and when the grinding operation has been performed the blank is automatically removed from the recess in the carriage and falls away, and the chutes are so located and the carriage so constructed that two blanks are being acted upon and a ground blank is discharged at the end of the reciprocation of the carriage in each direction.

In the drawings, Figure 1 is a plan view showing a portion of the rotary grinder. Fig. 2 is a cross-section at the line 2 2, Fig. 1, one chute being removed. Fig. 3 is a longitudinal section at the line 3 3, Fig. 1, the chutes being omitted. Fig. 4 is a section of the grinding-bar and hopper. Fig. 5 is an elevation of the parts adapted to the grinding of finger-plates for cutter-bars, such as shown in Fig. 6.

A suitable foundation receives bed-plates A, and the grindstone B is supported in suitable bearings C and driven by power applied to the pulley D, and I remark that where articles are to be ground with a cutting edge it is usually advantageous to present such articles to the periphery of the grindstone.

I have shown the mechanism as adapted to present the articles to be ground to the periphery of the stone. Upon the bed is a slide-rest E, there being a guide-bar 6 and bearing 7 upon the bed-plates for holding the slide-rest in position, and a screw F through the stationary cross-bar G is adapted to move the rest E nearer to or farther from the grinder B. The slide-rest E is made in two parts, the upper part E' being an inverted trough bolted by a flange at 8 to the lower part E of the slide-rest, and there is a carriage H, adapted to being moved longitudinally of the slide-rest and across the grinding-face of the stone, the motion being substantially parallel to the grinding-surface, and in order to give to this carriage H a reciprocating movement any suitable mechanism may be provided. I, however, prefer to use the endless screw K, supported in suitable bearings upon the foundation and rotated by a pulley 10 and belt or other convenient mechanism, and the pivoted fork 11, which is engaged by the endless screw, is upon an arm $h$, extending out from the carriage H, so that the endless screw gives a regular motion first in one direction and then in the other to the carriage. This carriage is constructed with reference to forming a reliable support to the articles that are being ground, to moving with freedom, and at the same time to preventing vibration under the grinding operation, and with this object in view there are two rollers or small wheels I, resting upon the top of the slide-rest E and beneath the carriage and near the places where the articles being ground are supported. There is also a wheel L, that is at or near the center of the carriage and of a size to correspond with the distance between the surface of the slide-rest E and the under surface of the upper portion E', so that this wheel L prevents the back part of the carriage either rising or falling, and upon the top of the carriage are horizontal wheels N on vertical arbors, and the diameter of these wheels N is such as to correspond to the width of the inverted trough E' of the slide-rest, so that the carriage is free to be moved endwise, but is kept reliably in the proper position, and it is not liable to vibrate under the grinding action.

At the side of the carriage adjacent to the grinder is a grinding-bar $e$, formed with or connected to the carriage, and the same is properly shaped for receiving the article to be ground and presenting the same to the grindstone. In Figs. 1 and 3 this grinding-bar $e$ is represented as having recesses 12 and 13 for the reception of the mowing-machine cutter-blanks, such recesses being adapted to receive the cutter-blanks with the edges to be ground substantially horizontal, and one recess is adapted to hold the cutter-blank while one edge is being ground, and the other recess is adapted to holding the cutter-blanks while the other edge is being ground.

Upon the slide-rest E' are the hoppers or chutes M M', which remain in fixed positions, and they are adapted to receive the blanks to be ground, and when such blanks are for mowing-machine cutters the chutes are made with inclined bottoms adapted to hold the cutter-blanks with the edge to be ground substantially horizontal, and the chutes are at such inclinations as to cause the blanks to slide down gradually, with the lower blank resting against the surface of the grinding-bar, and as this grinding-bar is moved by and with the carriage and a recess passes the end of the chute a cutter-bar blank drops into such recess and is carried away along with the grinding-bar, and this takes place when the carriage is moving in such a direction that the blank to be ground is carried toward the grinder, and it is held in the recess in the grinding-bar by the stationary bar m between the two chutes M M', and the cutter-blank is carried across the face of the grinder and then back again, and it cannot receive a second blank to be ground until the first one has been removed. The extent of travel, therefore, is made sufficient to carry the blank that has been ground past the edge of the chute from which it has been received and entirely clear of such chute, and the ground blank is forced out of the recess by any suitable means.

I sometimes employ a longitudinal groove n, Figs. 4 and 5, in the face of the grinding-bar, and a finger o', which is stationary in such groove, underruns the ground blank, so that it falls away from the grinding-bar into an opening in the carriage and drops through the same and through an opening in the rest into a suitable receptacle.

It will be observed upon reference to Fig. 1 that the positions of the recesses 12 and 13 in the grinding-bar are such that as one ground blank is removed by a finger as the grinding-bar and carriage reach the extreme movement in one direction the blank that has been received from the other chute has been carried in one direction across the face of the grinder, and it is carried back again by the movement in the other direction of the carriage, and that ground cutter-bar blank is carried past the chute from which it was received and discharged by a finger, and in all instances as the empty recess passes across the lower end of the chute it receives into it another blank to be ground, and the operations are repeated. It is also to be borne in mind that the length of the grinding-bar beyond the recesses must be sufficient to prevent blanks falling out of the chutes, the movement of the carriage not being sufficient to cause the end of the grinding-bar to uncover either of the chutes.

After a cutter-blank has been ground on one edge it is to be placed in the other hopper, so as to be ground on the other edge, and in consequence of the opening in the carriage being hopper-shaped the ground blank will slide down the hopper with the back edge of the cutter against the hopper. Thereby there is little or no risk of injuring the sharp edge of the cutter.

When the present improvement is being used for grinding the finger-plates of the cutter-bars, the hoppers or chutes for receiving the same are vertical, or nearly so, and the grinding-bar has a surface that is but little inclined, as seen in Fig. 4, so that the edge of the finger-plate can be ground at about seventy degrees inclination. In this case the finger o' may be in the form of a spring with one end in the groove in the grinding-bar, and where this is placed between the chute and the holding-bar m such spring-finger o' will rise as the blank to be ground passes beneath it, and it will act to lift and throw out such blank previous to the recess reaching the chute from which the blank is fed.

By placing the finger o upon an upright shaft, as seen in Figs. 1, 2, and 3, and providing a crank-arm at the lower end the finger may receive a turning movement by the carriage coming in contact with the crank-arm thereof, so as to give to the finger a turning motion that will carry the ground blank out from the recess in discharging the same, and if the plate l is connected with the wheel-guide E' the cutter-blanks that have been ground on one edge can fall upon this plate l and be picked up from the same and inserted into the other chute M' from time to time to have the other edge ground previous to being discharged from the machine through the opening p.

As before intimated, the chutes may be shaped according to the character of article to be ground.

I claim as my invention—

1. The combination with a revolving stone or grinder and the bed, of a slide-rest upon the bed, means for adjusting the slide-rest and the parts carried by it toward or from the stone, a carriage supported by the slide-rest and means for moving the carriage endwise first in one direction and then in the other, a grinding-bar upon the carriage having a recess for the reception of the article to be ground, a chute for supplying the blank to the recess and a bar for holding the article in the recess while being moved with and by the grinding-bar into contact with the grinder, and means for removing the article from the recess in the grinding-bar, substantially as set forth.

2. The slide-rest having an inverted trough-shaped wheel-guide, in combination with a carriage having supporting-rolls, end wheels in the wheel-guide, a grinding-bar upon the carriage, recessed for the reception of the blank to be ground, a chute for supplying such blank, and means for removing the article from the grinding-bar after being ground, substantially as set forth.

3. The combination with a grinder, of a grinding-bar having two recesses, two chutes for supplying blanks to be ground, means for giving to the grinding-bar an end motion, first in one direction and then in the other, a stationary holding-bar between the two chutes, and fingers for removing the ground articles from the recesses near the extreme movements of the grinding-bar, substantially as set forth.

4. The combination with the rotary grinder and the supporting-bed, of a slide-rest upon the bed, means for adjusting the rest and the parts carried by it toward or from the grinder, a carriage and supporting and guiding rolls for the same upon the slide-rest, an endless screw for moving the carriage first in one direction and then in the other, a grinding-bar on the carriage having recesses for receiving the articles to be ground, chutes for supplying the blanks, such chutes terminating at the surface of the grinding-bar, a holding-bar between the chutes for keeping the blanks in the recesses while under the action of the grinder, fingers for removing the ground articles from the recesses, substantially as set forth.

5. The combination with the rotary grinder and the supporting-bed, of a slide-rest upon the bed, a screw for adjusting the rest and the parts carried by it toward and from the grinder, a carriage and supporting and guiding rolls for the same upon the slide-rest, an endless screw for moving the carriage first in one direction and then in the other, a grinding-bar on the carriage having recesses for receiving the articles to be ground, chutes for supplying the blanks, such chutes terminating at the surface of the grinding-bar, a holding-bar between the chutes for keeping the blanks in the recesses while under the action of the grinder, a finger and a vertical shaft for supporting the same and an arm by which the finger can be turned by the action of the carriage to discharge the article ground from the recess in the grinding-bar, substantially as set forth.

6. The combination with the grinder and the bed, of a slide-rest, means for adjusting the same toward or from the grinder, a carriage upon the slide-rest and means for giving to the same an end movement, a grinding-bar upon the carriage adapted to receive the article to be ground, a hopper or chute for supplying such article, and means for discharging the article ground from the grinding-bar, there being an opening or hopper through the carriage for passing the ground article to a receptacle below the carriage, substantially as set forth.

7. The combination with the rotary grinder and the supporting-bed, of a slide-rest upon the bed, means for adjusting the rest and the parts carried by it toward or from the grinder, a carriage and supporting and guiding rolls for the same upon the slide-rest, means for moving the carriage first in one direction and then in the other, a grinding-bar on the carriage recessed for receiving the articles to be ground, a chute for supplying the blanks, such chute terminating at the surface of the grinding-bar, a stationary holding-bar for keeping the blanks in the recesses while under the action of the grinder, and means for removing the ground article from the recess, substantially as set forth.

8. The combination with a revolving stone or grinder and the bed, of a slide-rest upon the bed, means for adjusting the slide-rest and the parts carried by it toward or from the stone, a carriage and rollers for sustaining the carriage both vertically and horizontally, and means for moving the carriage endwise, a grinding-bar upon the carriage having a recess for the reception of the article to be ground, and a longitudinal groove, a chute for supplying the blank to the recess, a stationary bar for holding the article in the recess while being ground, and a finger in the longitudinal groove for removing the article being ground, substantially as set forth.

9. In a grinding-machine, the combination with the rotating grinder, of a carriage, means for holding the same in position and for reciprocating the carriage endwise, a grinding-bar carried by the carriage and having a recess for the article to be ground, and a longitudinal groove and a finger in the groove for removing the article that has been ground, substantially as set forth.

10. The combination with the rotary grinder and bed, of a carriage upon the bed, means for reciprocating the carriage, a grinding-bar adapted to receive and hold the article to be ground, means for discharging the article that has been ground from the grinding-bar, there being an opening through the carriage allowing the discharged article to pass away, substantially as set forth.

Signed by me this 5th day of November, 1897.

GEO. G. CROWLEY.

Witnesses:
GEO. T. PINCKNEY,
S. J. HAVILAND.